(12) United States Patent
Lor et al.

(10) Patent No.: US 11,340,609 B2
(45) Date of Patent: May 24, 2022

(54) SYSTEMS AND METHODS FOR PROVIDING DRIVING GUIDANCE

(71) Applicant: FORMULA SQUARE HOLDINGS LTD, Hong Kong (CN)

(72) Inventors: Felix Wing Keung Lor, Hong Kong (CN); Chun Hong Chan, Hong Kong (CN); King Leung Tai, Hong Kong (CN); King Hei Tai, Hong Kong (CN)

(73) Assignee: Formula Square Holdings Ltd, Hong Kong (CN)

( * ) Notice: Subject to any disclaimer, the term of this patent is extended or adjusted under 35 U.S.C. 154(b) by 236 days.

(21) Appl. No.: 16/627,345

(22) PCT Filed: Apr. 28, 2019

(86) PCT No.: PCT/CN2019/084829
§ 371 (c)(1),
(2) Date: Dec. 30, 2019

(87) PCT Pub. No.: WO2019/210821
PCT Pub. Date: Nov. 7, 2019

(65) Prior Publication Data
US 2021/0149393 A1  May 20, 2021

Related U.S. Application Data

(60) Provisional application No. 62/666,104, filed on May 3, 2018.

(51) Int. Cl.
*G09B 9/048* (2006.01)
*G05D 1/00* (2006.01)
(Continued)

(52) U.S. Cl.
CPC ........... *G05D 1/0044* (2013.01); *A63H 17/40* (2013.01); *A63H 30/04* (2013.01);
(Continued)

(58) Field of Classification Search
CPC .. G05D 1/0044; G05D 1/0223; G05D 1/0246; G05D 1/0255; A63H 17/40;
(Continued)

(56) References Cited

U.S. PATENT DOCUMENTS 8,818,708 B2    8/2014  Mathieu et al.
9,892,546 B2 *  2/2018  Jenkins ................. G06T 19/003
(Continued)

FOREIGN PATENT DOCUMENTS

CN    101858781    10/2010
CN    102137252    7/2011
(Continued)

OTHER PUBLICATIONS

U.S. Appl. No. 62/614,475, filed Jan. 7, 2018 (Year: 2018).*

*Primary Examiner* — Calvin Cheung
(74) *Attorney, Agent, or Firm* — Eagle IP Limited; Jacqueline C. Lui; Jennifer G. Che

(57) ABSTRACT

A driving guidance system that provides a driving guidance to a driver when the driver makes operations to remotely control a vehicle in a driving route. The driving guidance system includes at least one driving guidance equipment, an analytic engine, a control platform. The driving guidance equipment is distributed along the driving route for recording data of the vehicle. The analytic engine receives and analyzes the data of the vehicle to generate a plurality of features of the vehicle. The control platform further includes a real virtuality objects generator and a display. The real virtuality objects generator generates a plurality of real virtuality objects based on the features of the vehicle and the display shows the real virtuality objects to the driver of the vehicle for providing the driving guidance.

14 Claims, 9 Drawing Sheets

(51) Int. Cl.
*A63H 17/40* (2006.01)
*A63H 30/04* (2006.01)
*G01C 21/36* (2006.01)
*G05D 1/02* (2020.01)
*G09B 9/052* (2006.01)
*A63F 9/14* (2006.01)

(52) U.S. Cl.
CPC ....... *G01C 21/3647* (2013.01); *G05D 1/0223* (2013.01); *G05D 1/0246* (2013.01); *G05D 1/0255* (2013.01); *G09B 9/052* (2013.01); *A63F 9/143* (2013.01); *A63F 2250/52* (2013.01)

(58) Field of Classification Search
CPC ..... A63H 30/04; A63F 9/143; A63F 2250/52; G01C 21/3647
See application file for complete search history.

(56) References Cited

U.S. PATENT DOCUMENTS

| | | | |
|---|---|---|---|
| 11,079,753 B1* | 8/2021 | Roy | G05D 1/0038 |
| 2004/0186837 A1 | 9/2004 | Lambert et al. | |
| 2010/0289634 A1 | 11/2010 | Ikeda et al. | |
| 2015/0187224 A1* | 7/2015 | Moncrief | G09B 9/24 434/30 |
| 2017/0087451 A1* | 3/2017 | Champagne | G06F 3/016 |
| 2019/0009175 A1* | 1/2019 | Buxton | A63F 13/26 |
| 2019/0139436 A1* | 5/2019 | Ashry | G09B 19/167 |
| 2019/0359258 A1* | 11/2019 | Muenster | B62D 15/0285 |
| 2020/0098185 A1* | 3/2020 | Schradin | G09B 9/003 |
| 2020/0122027 A1* | 4/2020 | Erikawa | A63F 13/285 |

FOREIGN PATENT DOCUMENTS

| | | | | |
|---|---|---|---|---|
| CN | 103950409 A | | 7/2014 | |
| CN | 104900112 A | | 9/2015 | |
| CN | 105080134 | | 11/2015 | |
| CN | 106215427 | | 12/2016 | |
| CN | 106227230 A | | 12/2016 | |
| CN | 106257543 A | | 12/2016 | |
| CN | 106422322 | | 2/2017 | |
| CN | 106696701 | | 5/2017 | |
| CN | 207203434 U | | 4/2018 | |
| DE | 102018208703 A1 | * | 12/2019 | ........... G01C 21/365 |
| KR | 101673927 B1 | * | 11/2016 | |
| KR | 20160146384 A | * | 12/2016 | |
| KR | 20180068123 A | * | 6/2018 | |
| WO | WO-2018091861 A1 | * | 5/2018 | ......... A63F 13/2145 |

* cited by examiner

SYSTEMS AND METHODS FOR PROVIDING DRIVING GUIDANCE

FIELD OF TECHNOLOGY

This invention relates to systems and methods for providing driving guidance, in particular for users driving a radio-controlled remote vehicle. Equipping with the location-based technology, the driving guidance system can be extended to an application in real road traffic management.

BACKGROUND

First Person View (FPV) is a method used to control a radio-controlled vehicle from the player's viewpoint. The vehicle is a mobile machine, e.g. a car or a drone, either driven or piloted remotely from a first-person perspective via an onboard camera, fed wirelessly to video FPV goggles or a video monitor so that the driver or pilot can monitor and control the vehicle.

Driving a vehicle is a skill that needs a lot of experiences. Normally the experiences can only be gained by repeated practicing or training. In recent years, driving assistance such as warning of the potentially hazardous environment is being developed to increase the driving safety through proactive or predictive control interventions.

New methods and systems that meet advancing technological needs and enhance the driver's driving experience are desirable.

SUMMARY

One example embodiment is a driving guidance system that provides a driving guidance to a driver when the driver makes operations to remotely control a vehicle in a driving route. The driving guidance system includes at least one driving guidance equipment, an analytic engine, a control platform. The driving guidance equipment is distributed along the driving route for recording data of the vehicle. The analytic engine receives and analyzes the data of the vehicle to generate a plurality of features of the vehicle. The control platform further includes a real virtuality objects generator and a display. The real virtuality objects generator generates a plurality of real virtuality objects based on the features of the vehicle and the display shows the real virtuality objects to the driver of the vehicle for providing the driving guidance.

One example embodiment is a method for providing a driving guidance to a driver when the driver is making operations to control a vehicle remotely on a driving route. The method includes installing at least one driving guidance equipment along the driving route, collecting data of the vehicle by the driving guidance equipment, generating a plurality of features of the vehicle by analyzing the data of the vehicle by an analytic engine, generating a plurality of real virtuality objects based on the features of the vehicle by a real virtuality object generator, and displaying the real virtuality objects to the driver of the vehicle by a display for providing the driving guidance.

One example embodiment is driving guidance system that provides a driving guidance to a driver when the driver is operating a vehicle in a driving route. The driving guidance system includes a plurality of sensors that is installed in the vehicle for acquiring operation information of the vehicle, at least one driving guidance equipment that is distributed along the driving route for recording data of the vehicle and a condition of the driving route, an analytic engine that receives and analyzes the operation information of the vehicle, the data of the vehicle and the condition of the driving route to generate guidance information for the vehicle, and a display that is installed in the vehicle for displaying the guidance information to the driver to provide the driving guidance. The driving guidance equipment includes a plurality of cameras that monitors and records driving behavior of the vehicle, a speed detector that measures and records a driving speed of the vehicle, and a plurality of road sign transmitters on road signs along the driving route that transmit the guidance information to the vehicle when the vehicle passes by the road signs.

DETAILED DESCRIPTION

Figure 1:
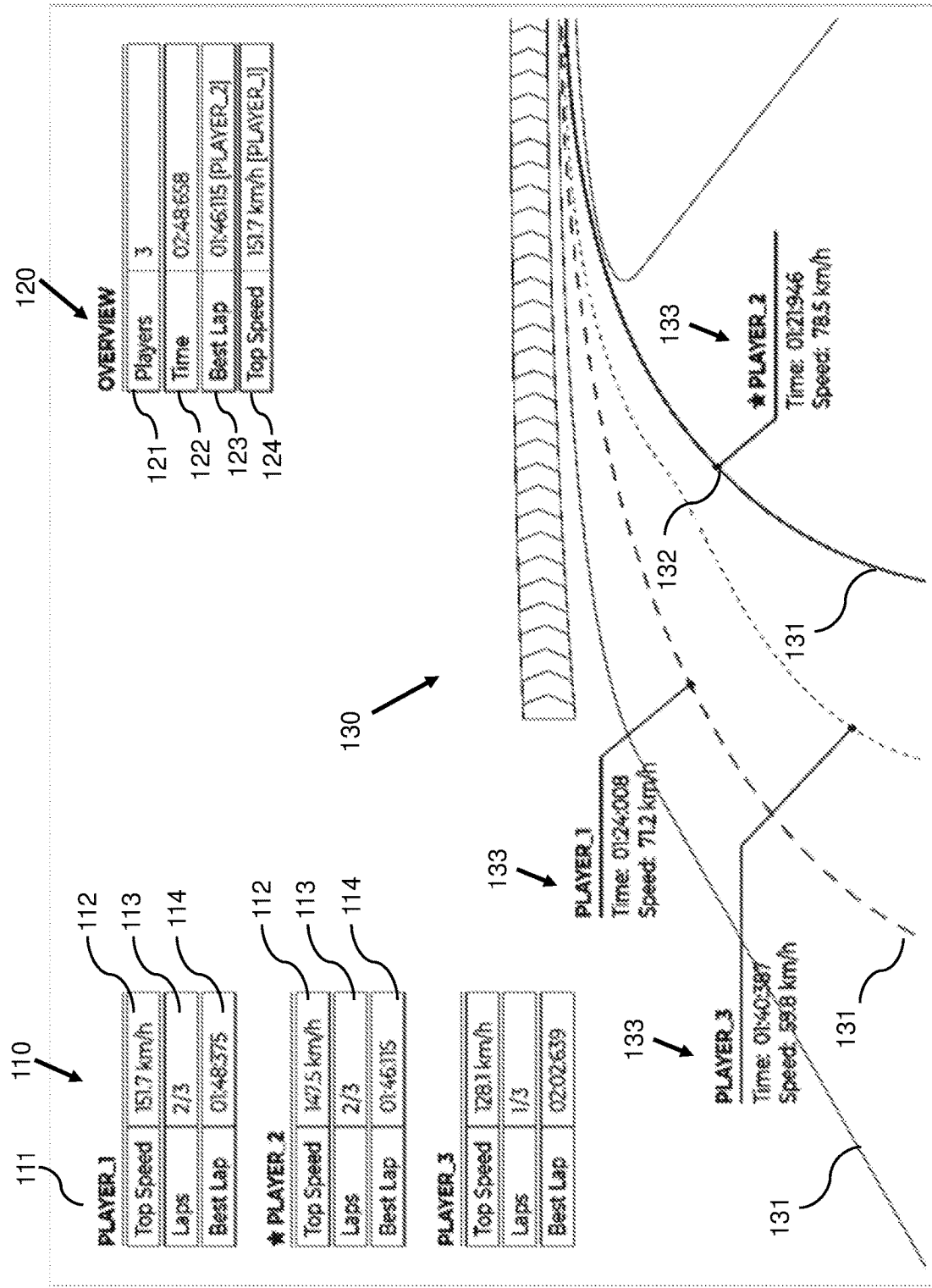
FIG. 1 shows a FPV display with racing information in accordance with an example embodiment.

As used herein, "real virtuality" is the result of blending a virtual background or objects into the reality by computational graphical processing with the use of live camera feeding into a display or a video headset.

As used herein, "braking point" is the position on the racing line where the vehicle is braked before a corner.

As used herein, "turn-in point" is the position on the racing line at which the vehicle turns into the corner.

As used herein, "apex" is the point on the racing line at which the vehicle is nearest to the inside of the corner.

As used herein, "exit point" is the point on the racing line at which the vehicle reaches the outside of the racing track after it passes the corner.

FPV racing is one of the most popular video game genres associated with e-Sports. The FPV systems provide images through a display or a video headset. The players immerse in the view of the pilot or driver to control the vehicle. Existing FPV systems do not offer recommendations for player to improve their driving skill. The players can only do so by repetitively racing, without guidance from the FPV systems to assist the driving, shorten the racing time for each lap or decrease the risk of making mistakes.

Conventional driving assistance methods usually collect data of the vehicle and the route by installing sensory equipment and cameras onto the body of the vehicle. Combined with the position of the vehicle that is acquired by a navigation system, the driver is informed of potentially hazardous situations. Further, braking interventions may be triggered if a critical driving situation is to be expected on the basis of route information and instantaneous position data of the vehicle. It is a vehicle-centric approach. However, no driving guidance is adopted a dynamic road distributed approach which provides to different drivers to enhance their driving skill when the vehicle is considered to be moving in a stable and safe mode based upon the instant road traffic situation.

Example embodiments solve the problem by acquiring information of the vehicle during the driving by equipment installed inside or near the driving route, analyzing the information and presenting driving guidance to the drivers in real-time or in offline mode.

Example embodiments install cameras, sensors and transmitters inside or near the driving route for recording and sending information of the vehicles during driving. For example, the cameras record the driving behavior of each vehicle; the speed sensors record the driving speed of each vehicle; the distance sensors record the exact position of each vehicle inside the driving route; and the pressure sensors record the pressure imposed on the driving route when the vehicle passes by. The transmitters send the information of the vehicles acquired by the camera and sensors and other necessary messages to a receiver that is subsequently stored in a database for analysis.

The information of the vehicle stored in the database is analyzed by an analytic engine. The analytic engine studies and compares the driving performance of each driver and provides real-time driving guidance to the driver in the subsequent driving course. The driving guidance includes recommending the driving speed, the driving path and the turning points, presenting warning messages and speed limit, and sending other messages that may be of interest to the driver. The analytic engine can also push specific dynamic advertisement to the driver based on the analysis. In a multi-player FPV racing, dynamic advertisement can be placed on different broadcasting videos.

The driving guidance information can be superimposed onto a display in front of the driver in real time. The driver may refer to the driving guidance information so that he can adjust the driving behavior including the driving speed, the driving path and the turning angle from time to time, especially when he is passing the bends. The information of the vehicles operated by other drivers can be shown in the display as well. Therefore, the driver can compare his driving performance with others in the driving and adjust his driving behavior accordingly.

Further, the stored information of the vehicles can be displayed offline to the driver. The driver can select a particular opponent and the display shows the differences between the opponent's driving record against the driver's own one. Also, the driver can review all past driving records including those of himself and the others. So that he may improve the driving skill by observing and learning from all the past experiences of himself and others.

The driving guidance system introduced herein prevails over the conventional driving assistance systems and methods by providing a full-range driving guidance to the vehicle that covers the whole driving route. In addition to providing warnings for the driver to remind the potentially hazardous situation, the driving guidance system can also provide customized information that is helpful for enhancing the driver's driving skill.

The driving guidance system can be employed for driving vehicle such as an ordinary car. It can also be used for operating other vehicles such as a remote-controlled car. Example embodiments provide examples of First-Person-View (FPV) racing car and an ordinary car as being the vehicle. Example embodiments, however, are not limited to a particular type of vehicle. Various types of vehicles that need control and/or operation can be executed as part of an example embodiment.

FIG. 1 shows a FPV display with racing information in accordance with an example embodiment.

In one embodiment for example, the driving guidance system is employed for FPV racing. FPV is a method used to control a radio-controlled vehicle from the driver or pilot's viewpoint. The vehicle is either driven or piloted remotely from a first-person perspective via an onboard camera that is fed wirelessly to video FPV goggles or a video monitor. The driver immerses in the first-person perspective to control the vehicle. The example embodiment offers guidance information for the driver to adjust his driving behaviors, so as to shorten the racing time for each lap and/or decrease the risk of making mistakes.

One example embodiment includes three vehicles operated by three players in the racing. As shown in FIG. 1, the information displayed on the monitor in front of the driver includes an individual column 110 that shows performance of each player, an overview column 120 that shows an overview of race statistics gathered from all players, and a racing track 130 with the racing line 131 of each vehicle.

The individual column 110 demonstrates the player ID 111, the top speed 112, the number of laps 113 and the time spent for the best lap 114 for each player. The overview column 120 shows the total number of players 121, the time elapsed in the racing 122, the time spent for the best lap and the player ID 123 for the best lap, and the top speed and the player ID who achieves the top speed 124.

In the example embodiment, the racing track 130 shows the racing line 131 recorded for each of the three players. When a particular point 132 on the racing line 131 is clicked or activated, a notification window 133 pops up to show the information of the vehicle by which the racing line is created, including the player ID, the time and speed when the vehicle passes the point 132. The fastest path and the leading player ID are also shown on the display, for example, by adding a star in the individual column 110 or notification window 133.

Figure 2:
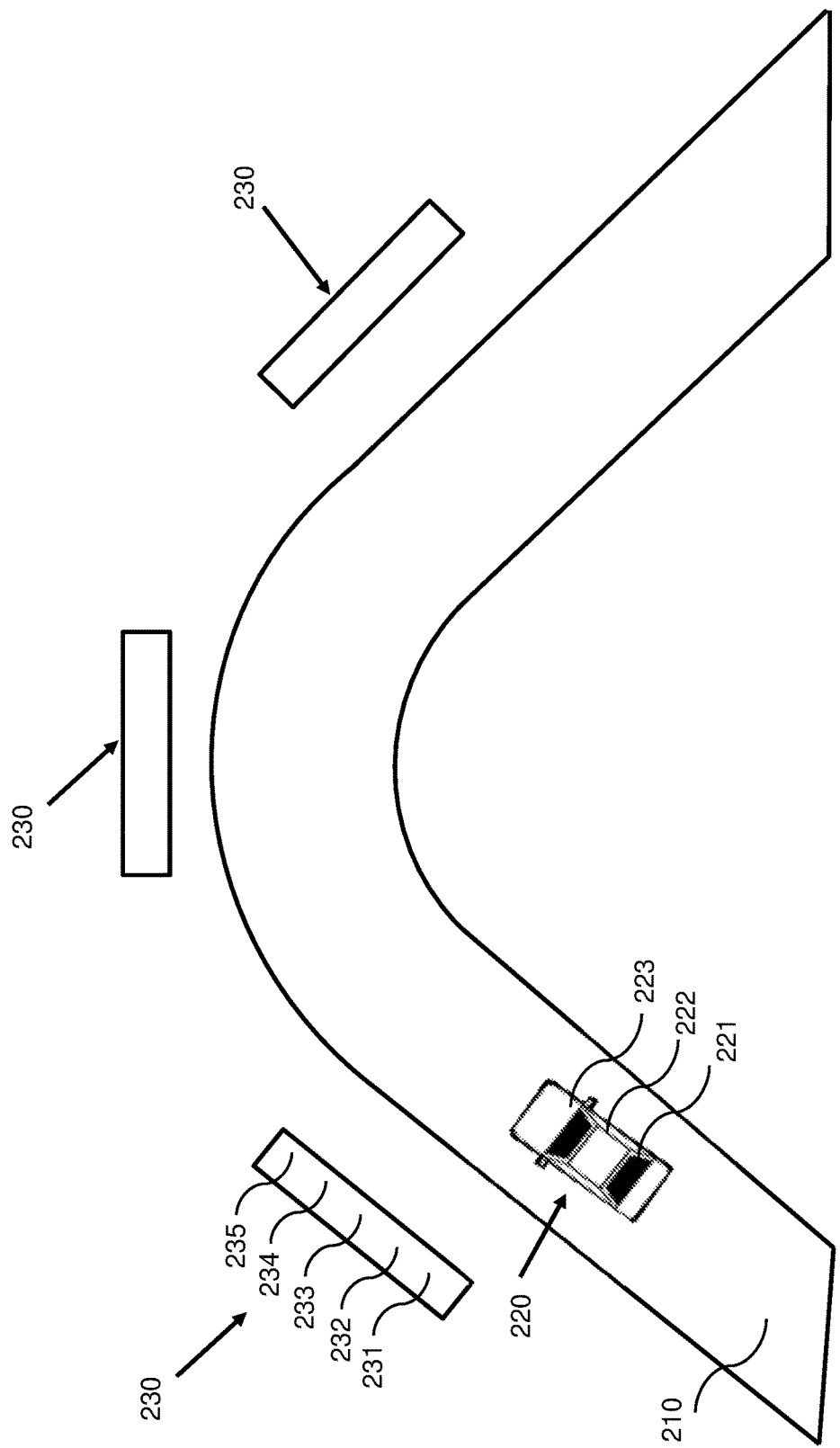
FIG. 2 shows a driving guidance equipment installation and a vehicle in accordance with an example embodiment.

FIG. 2 shows driving guidance equipment installation and a vehicle in a driving route in accordance with an example embodiment. The example embodiment shown in FIG. 2 includes a driving route 210, a vehicle 220 moving inside the driving route 210 and a plurality sets of driving guidance equipment 230 installed at the side of the driving route 210.

The driving guidance equipment 230 can be distributed along the driving route especially at some particular parts such as the turning bends. It includes one or more cameras 231 and one or more sensors 232 such as speed sensors, pressure sensors, lap sensor, sonar sensor, ultrasound sensor, infra-red sensor, laser sensor and other necessary sensors for recording data of the vehicle 220. It also includes a module 233 to aggregate all the data of the vehicle 220 and one or more transmitters 234 to send the data of the vehicle 220 and other messages to a receiver.

In one example embodiment, the vehicle 220 includes an RFID tag 221, and the driving guidance equipment 230 includes an RFID reader 235 to identify the RFID tag 221 so that it can distinguish the recorded information and associate the acquired information with each individual vehicle when there is more than one vehicle on the driving route.

In one example embodiment, vehicle 220 includes a receiver 222 and a controller 223. The transmitters 234 in the driving guidance equipment 230 can send speed limit signal to the vehicle to limit its speed, for example, as a penalty when the driver violates the regulation or as a driving rule to set different speed limit at different section of the driving route. The receiver 222 receives the signal and send the signal to the controller 223 to limit the speed of the vehicle by the controller 223 automatically.

In one example embodiment, the driving guidance equipment further includes throttle position sensor, suspension monitoring sensor, gear position and control sensor, brake sensor, pedal position monitoring sensor and steering angle measurement sensor. The sensors are installed on the body of an ordinary vehicle 220 that operated by a driver or the control platform of a remote-controlled vehicle 220. These in-vehicle sensors and control are useful for guidance or auto-piloting applications once the guidance signals are received by the vehicles through dynamic electronic road signs.

Figure 3:
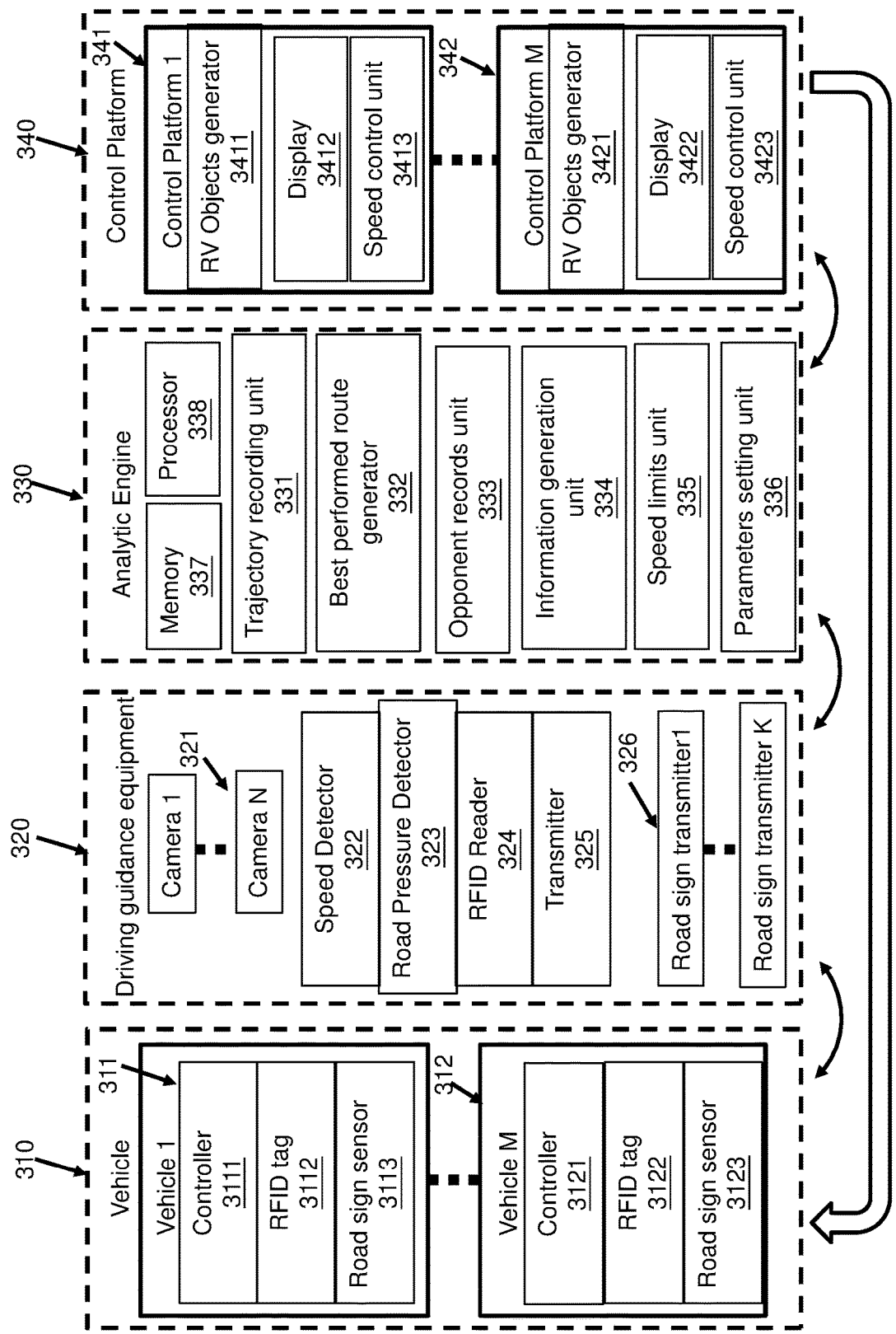
FIG. 3 shows a system for providing driving guidance for FPV racing in accordance with an example embodiment.

FIG. 3 shows a system for providing driving guidance for FPV racing in accordance with an example embodiment. The example embodiment in FIG. 3 includes M remote-controlled vehicles 310 (from vehicle 1 to vehicle M, M is an integer), a driving guidance equipment 320, an analytic engine 330, and M control platforms 340 (from control platform 1 to control platform M) which corresponds to the M vehicles 310.

The vehicle 311 is equipped with a controller 3111 that controls the movement of the vehicle 311, a radio frequency identification (RFID) tag 3112 for identifying the vehicle 311 and a road sign sensor 3113. The vehicle M is also equipped with a controller 3121, an RFID tag 3122 and a road sign sensor 3123. The driving guidance equipment 320 includes one or more cameras 321 (from camera 1 to camera N, N is an integer), one or more speed detectors 322 such as speed sensors, one or more road pressure detectors 323 such as pressure sensors, one or more RFID readers 324, one or more transmitters 325 and one or more road sign transmitters 326 (from 1 to K, K is an integer).

The analytic engine 330 includes a memory 337, a processor 338, a trajectory recording unit 331, a best performed route generator 332, an opponents' records unit 333, an information generation unit 334, a speed limit unit 335 and a parameter setting unit 336.

The control platforms 340 includes M control platforms (from control platform 1 to control platform M). Block 341 shows a control platform 1 that includes a real virtuality (RV) objects generator 3411, a display 3412, and a speed control unit 3413. Block 342 shows a control platform M that includes a RV objects generator 3421, a display 3422, and a speed control unit 3423.

When the vehicles 310 are racing, the driving guidance equipment 320 records the data of the vehicles. For example, the camera 321 records the videos taking for the vehicles 310; the speed detector 322 records the speed of the vehicles 310; the road pressure detector 323 records the road pressure when the vehicles pass. The entire locus of each vehicle is recorded. Therefore, the track is equipped with many sensors so that it can record an integrated data of the vehicles. The RFID reader 324 in the driving guidance equipment 320 identifies the RFID tag 3112/3122 of the vehicles 310 and associates the camera record, the speed and pressure data with the RFID of each vehicle. The camera recording, and the speed and pressure data that are associated with the RFID of each vehicle are transmitted to the analytic engine 330.

The data of the vehicles are received by the analytic engine 330 and stored in the memory 337. The processor 338 in the analytic engine 330 analyzes all the stored data and generates a plurality of features of the vehicles 310. By way of example, the trajectory recording unit 331 generates the moving trajectory of the vehicles 310 by analyzing the videos captured by the cameras 321 of the vehicles. The best performed route generator 332 calculates the best performed route for each vehicle 310 by analyzing the data of the vehicles. The opponent records unit 333 generates the records of the other vehicles that one vehicle are racing with, for example, the opponent records unit 333 generates the records of vehicle 2 to vehicle M for the driver of vehicle 1. The speed limit unit 335 sets a speed limit for the vehicle 310 and information generation unit 334 generates other useful information based on the data of the vehicle, such as the past records of the driver, the performance of other drivers, road conditions or racing information as requested by the driver, etc.

The features of the vehicles, including the moving trajectory of the vehicle, the best performed route, the opponents' records, the speed limit and other useful information generated in the analytic engine 330 are sent to the RV objects generator 3411 and 3421 in the control platform 340 to generate RV objects. The RV objects are then presented in the display 3422 as driving guidance, so that the player who is driving the vehicle can make control operations through the speed control unit 3413 or 3423 to steer the vehicle 311 or 321 while watching the RV objects in the display 3422 and is therefore be assisted in driving by the information in the RV objects.

In one example embodiment, the speed control unit 3413/3423 includes a brake, a throttle, a gear stick, a steering wheels and other equipment for control the movement of the corresponding vehicle. By way of example, when the player makes operations on the speed control unit 3413 or 3423, the speed control unit 3413/3423 converts the operations into a first group of control signals and sends the first group of control signals to the controller 3111/3121 respectively so that the player can control the movement of the vehicle 311/312 remotely.

In one example embodiment, the RV objects include the racing information displayed in FIG. 1.

By way of example, the RV objects further include one or more driving guidance line that is superposed on the image of the driving route. The driving guidance line recommends optimized driving behaviors to the player. For example, it includes the braking point, the turn-in point, the apex, and the exit point in the turning bend and the optimized speed thereof. The drivers can refer to the driving guidance line and make an optimized turning at the bend.

In one example embodiment, the analytic engine 330 analyzes the FPV images captured in real-time by the on-board camera equipped in the vehicles 310, detect and superimpose advertisements on a banner, wall or other objects therein. The advertisement can be displayed to the drivers as RV video via the control platform 340. Meanwhile, it can also be broadcasted to different audience. The advertisement may change according to the regions. In addition, the background of the FPV images can be changed, for example, by adopting blue screen technology to create dynamic weathering or RV environment.

In one example embodiment, the analytic engine 330 can set parameters in the parameter setting unit 336, for example, set speed limit for the car at turning in order to align the car running properly on the track, or restrict the car not to take over the cars in front. The parameters are converted to a second group of control signals that are sent to one or more vehicles through the road sign transmitter 326. The vehicles 310 receives the parameters via the road signs sensor 3113 and/or 3123 and will be restricted in certain range of movement.

By way of example, the road sign transmitter 326 is installed on the road sign and is able to transmit a second group of control signals to the road sign sensor 3113/3123 that is equipped on the vehicle 311/312. When the vehicle 311/312 approaches a road sign, e.g., the vehicle is within a pre-set distance from the road sign, the road sign transmitter 326 can send a signal to the vehicle 311/312 corresponding to the RFID of the vehicle 311/312. For example, if the vehicle 311 violates the regulations when it passes a road sign, then a speed limit should be imposed thereon. One of the road sign transmitters 326 will identity the vehicle by its RFID and send a speed limit to the vehicle when it is approaching. Then the vehicle is restricted not to exceed such a certain speed limit.

In one example embodiment, the trajectory recording unit 331, the best performed route generator 332, the opponent records unit 333, the information generation unit 334, the speed limit unit 335 and the parameter setting unit 336 are programs that stored in the memory 337 and can be executed by the processor 338 in the analytic engine 330.

In one example embodiment, the road sign sensor 3113/3123 is equivalent to a road sign receiver.

Figure 4:
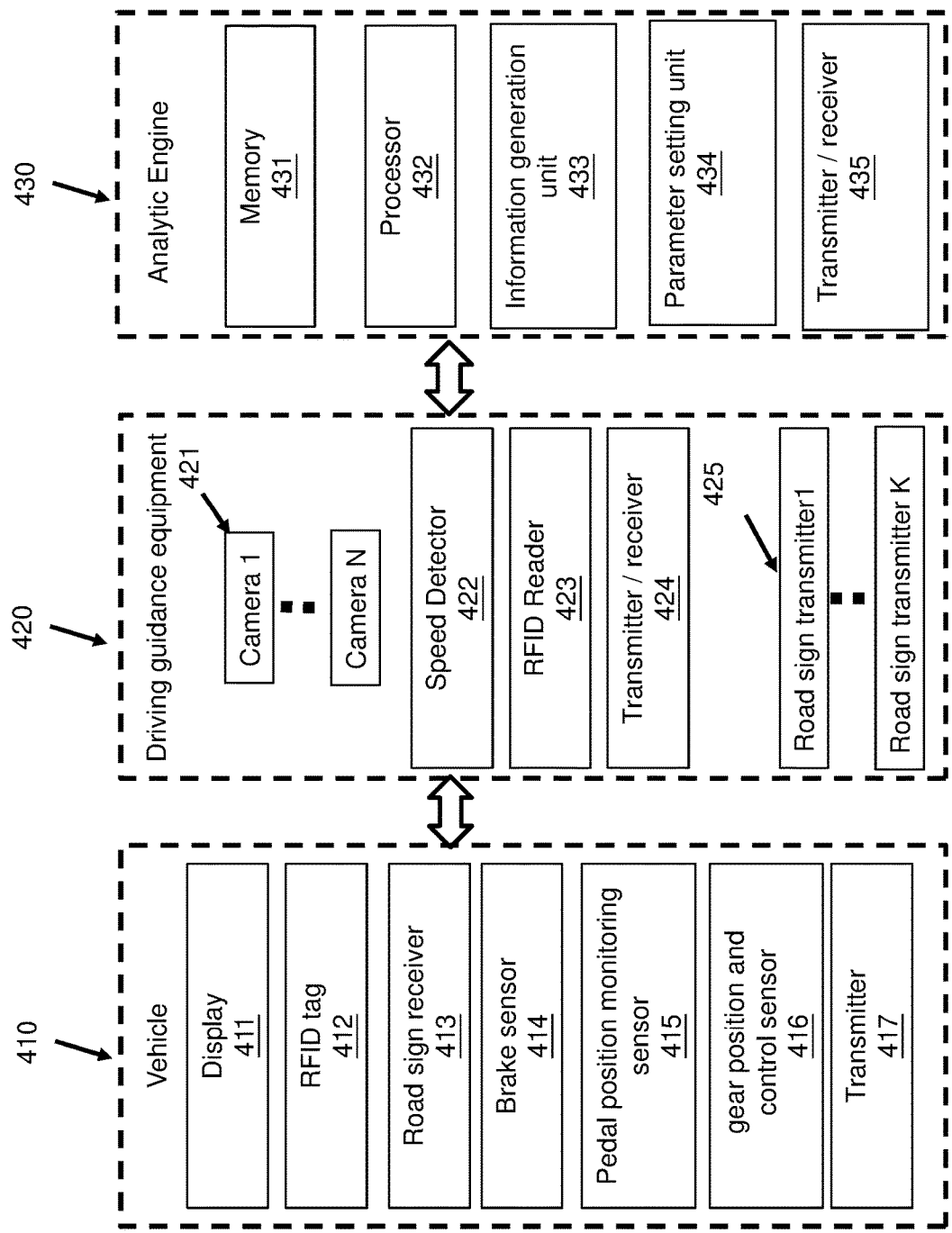
FIG. 4 shows a system for providing driving guidance for an ordinary vehicle in accordance with an example embodiment.

FIG. 4 shows a system for providing driving guidance for an ordinary vehicle in accordance with an example embodiment.

The driving guidance system can be applied into real world. As shown in FIG. 4, the driving guidance system includes a vehicle 410, driving guidance equipment 420, and an analytic engine 430. The vehicle 410 includes a display 411, an RFID tag 412, a road sign receiver 413, a brake sensor 414, a pedal position monitoring sensor 415, a gear position and control sensor 416, and a transmitter 417. The driving guidance equipment includes one or more cameras 421, one or more speed detectors 422, one or more RFID readers 423, one or more transmitters/receivers 424 and a plurality of road sign transmitters 425. The analytic engine 430 includes a memory 431, a processor 432, an information generation unit 433, a parameter setting unit 434 and a transmitter/receiver 435, wherein the information generation unit 433 and the parameter setting unit 434 are programs that can be executed by the processor 432.

When the vehicle 410 is in driving, the brake sensor 414, the pedal position monitoring sensor 415, and the gear position and control sensor 416 acquire the operation information of the vehicle 410 and send the same by the transmitter 417 to the analytic engine 430.

The driving guidance equipment 420 distributes along the driving route and records data of the vehicle 410 and conditions of the driving route. By way of example, it obtains the RFID of the vehicle 410 by the RFID reader 423, records the driving behavior of the vehicle 410 and the road condition by the camera 421, measures and records the driving speed of the vehicle 410 by the speed detector 422, and sends all the information to the analytic engine 430 by the transmitter/receiver 424.

The analytic engine 430 stores the information received from the vehicle 410 and the driving guidance equipment 420 in the memory 431 and analyzes the information by the processor 432. Based on the analysis, the information generation unit 433 generates the guidance information of the vehicle, which includes the driving performance of the driver, the road and traffic condition, or other information as requested by the driver. The guidance information is sent to the driving guidance equipment 420 by the transmitter/receiver 435 and the road sign transmitter 425 in the driving guidance equipment 420 transmits the information to the vehicle 410 when it passes by the road sign. The road sign receiver 413 in the vehicle 410 receives the guidance information and shows on the display 411 as a reference to the driver. With the information, the driver may make decisions to adjust his driving behavior or change the driving path. The information may also be used for guiding the auto-piloted vehicle to arrive at a destination in the shortest time or path.

The analytic engine 430 also analyzes the information in the processor 432 and sets parameters for the vehicle 430 in the parameter setting unit 434. For example, the analytic engine 430 measures road traffic according to the images received from the driving guidance equipment 420 and sets speed limit for the car at turning in order to align the car running properly on the track or restrict the car not to take over the cars in front.

The parameters are sent to the driving guidance equipment 420 by the transmitter/receiver 435 and the road sign transmitter 425 in the driving guidance equipment 420 transmits the information to the vehicle 410 when it passes by the road sign. The parameters received by the road sign receiver 413 either present as a visual/acoustic/haptic warning to the driver or serve as a control signal to the controller of the vehicle 410.

In one example embodiment, the vehicle 410 is equipped with one or more of a throttle position sensor, a suspension monitoring sensor, a gear position and control sensor, a brake sensor, a pedal position monitoring sensor and a steering angle measurement sensor. The sensors are used for acquiring the operation information of the vehicle, such as the throttle position, the suspension movement, the gear position, the brake position, the pedel position and the steering angle of the steering wheel etc.

Figure 5:
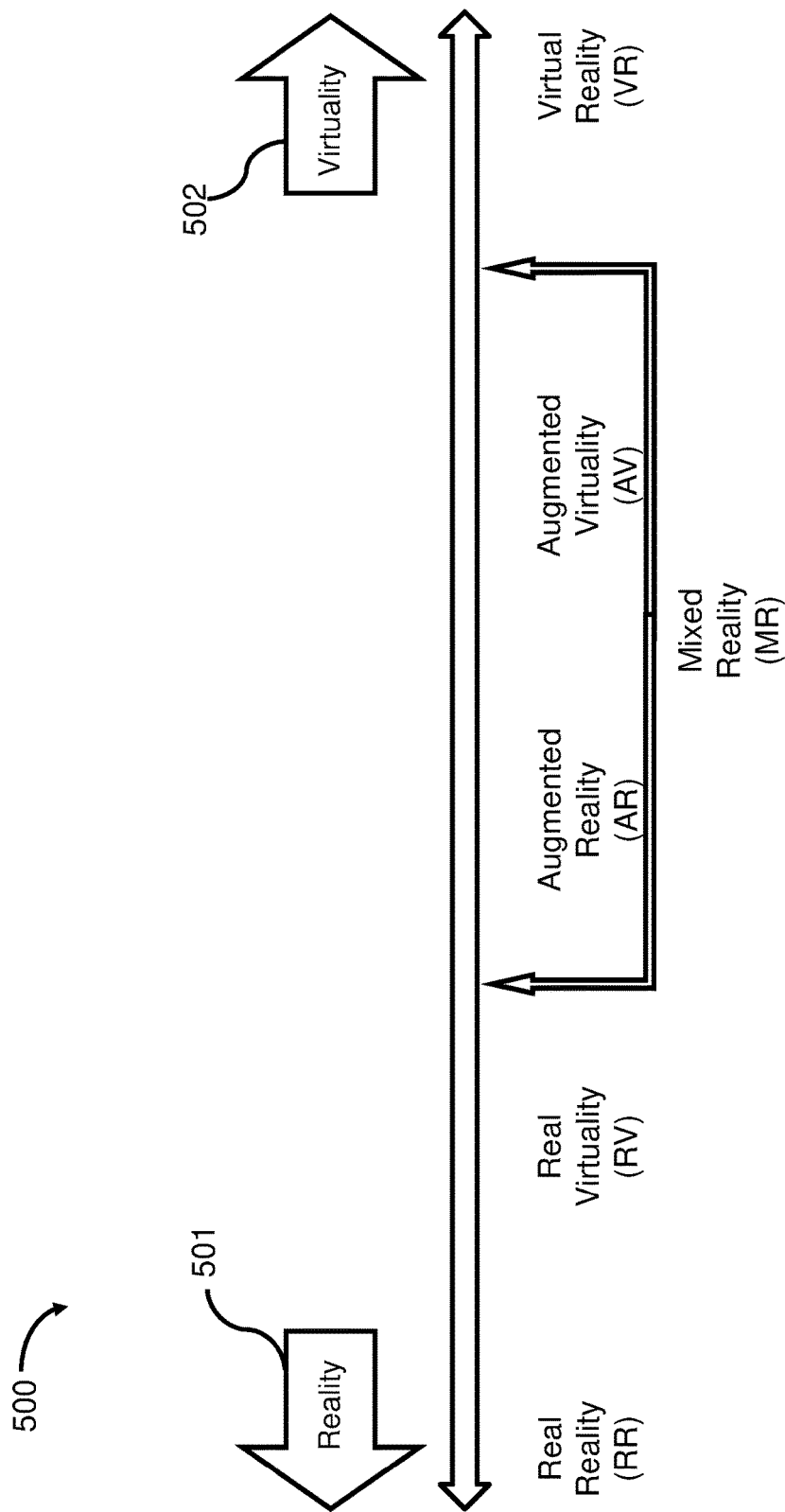
FIG. 5 shows a graph of reality-virtuality continuum.

FIG. 5 shows a graph 500 of reality-virtuality continuum. Reality 501 means real objects and real environment while virtuality 502 means virtual objects and virtual environment. Real Reality (RR) refers to real-world experiences, interactions and activities different from virtual world. Virtual Reality (VR) immerses users in a virtual environment with virtual objects. Augmented Reality (AR) overlays virtual objects on the real-world environment. Augmented Virtuality (AV) overlays real objects on the virtual-world environment. Mixed Reality (MR) not only overlays but anchors virtual objects to the real world. Real Virtuality (RV) is the result of blending a virtual backgrounds or objects into the reality by computational graphical processing with the use of live camera feeding into a display or a video headset, i.e., a head-mounted display.

Figure 6:
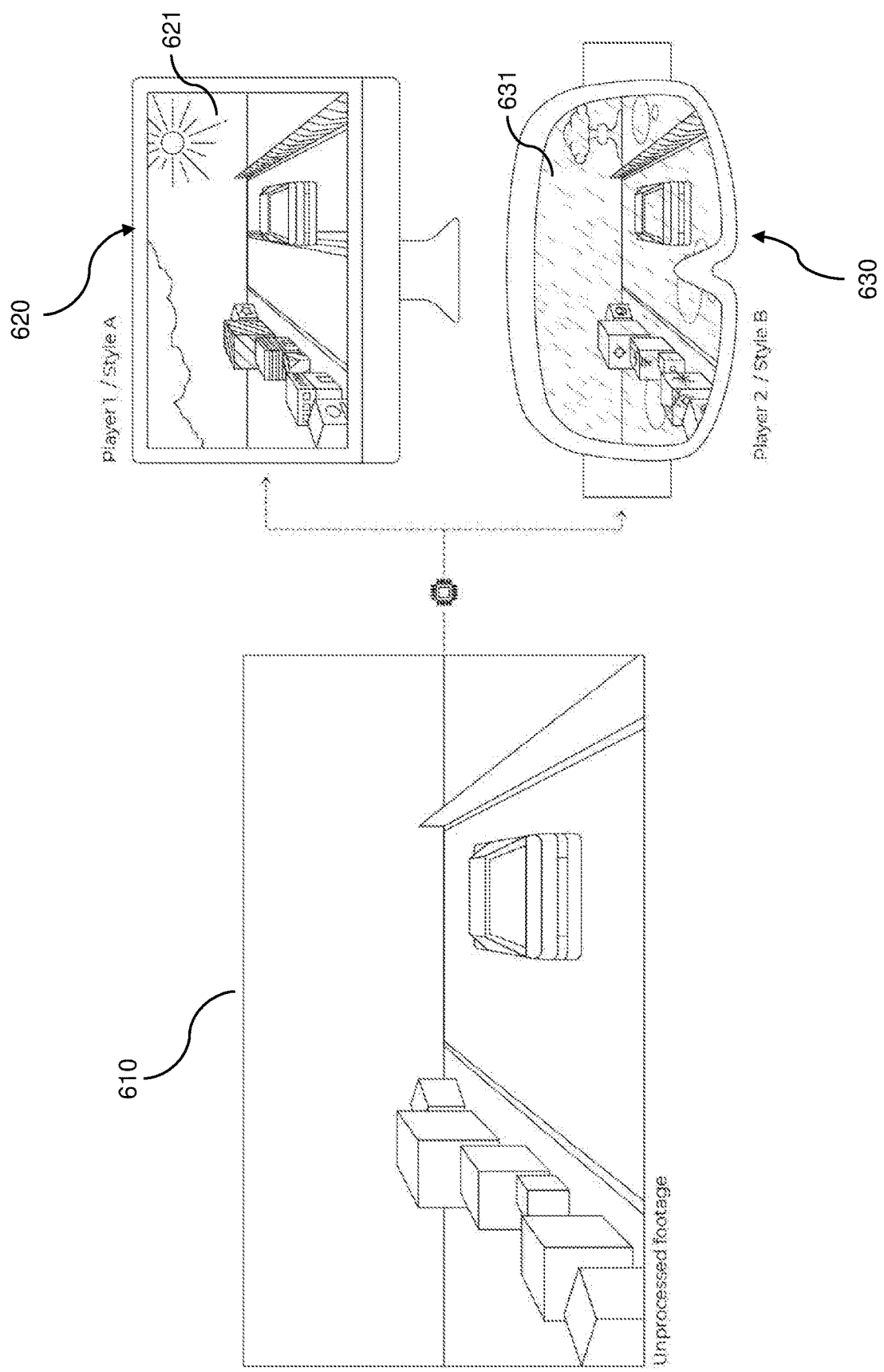
FIG. 6 shows a real virtuality (RV) display in accordance with an example embodiment.

FIG. 6 illustrates an RV display in accordance with an example embodiment.

By way of example, the image 610 is the original image captured by the camera in the driving guidance system that shows the vehicle and the driving environment. The processed image 621 includes advertisements as well as different background and dynamic weathering; and is shown in the RV display 620 of one player in the FPV racing competition. At the same time, another processed image 631 that includes different advertisements, different background and dynamic weathering is shown in the headset 630 of another player in the FPV racing competition.

Figure 7:
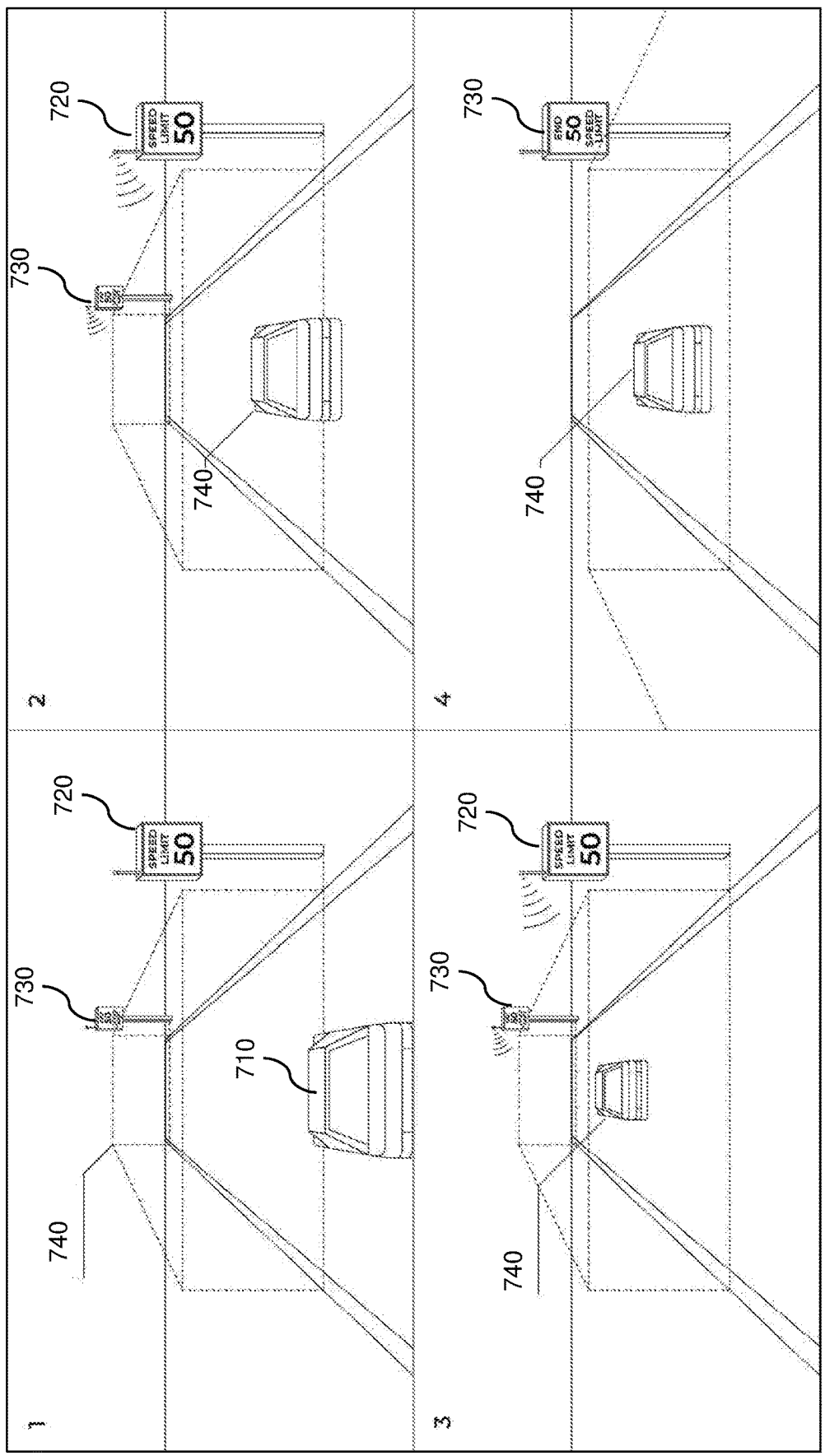
FIG. 7 shows a scenario of communication between the vehicle and the road sign transmitter/receiver in accordance with an example embodiment.

FIG. 7 shows a scenario of communication between the vehicle and the road sign transmitter/receiver in accordance with an example embodiment.

By way of example, the vehicle 710 approaches the road sign transmitter/receiver 720. The road sign transmitter/receiver 720 senses the RFID tag of the vehicle 710. Based upon the command of the driving guidance system (not shown), the road sign transmitter/receiver 720 transmits road sign information to the vehicle 710. For example, if the vehicle 710 violates the driving regulations, penalty will be given to the vehicle 710 to set restrictions, e.g., the vehicle 710 is restricted not to exceed a speed limit in the restriction zone 740. The speed limit is shown on the display for the driver. Further, the speed limit may be sent to the control unit of the vehicle 710 to restrict the vehicle 710 not able to exceed the limit. When the vehicle 710 passes the restriction zone 740 and another road sign transmitter/receiver 730 detects the vehicle 710, the road sign transmitter/receiver 730 may send a release signal of speed limit to the vehicle 710 to unlock the speed limit. After receiving the release signal, the vehicle 710 can accelerate to a speed higher than the speed limit again.

Figure 8:
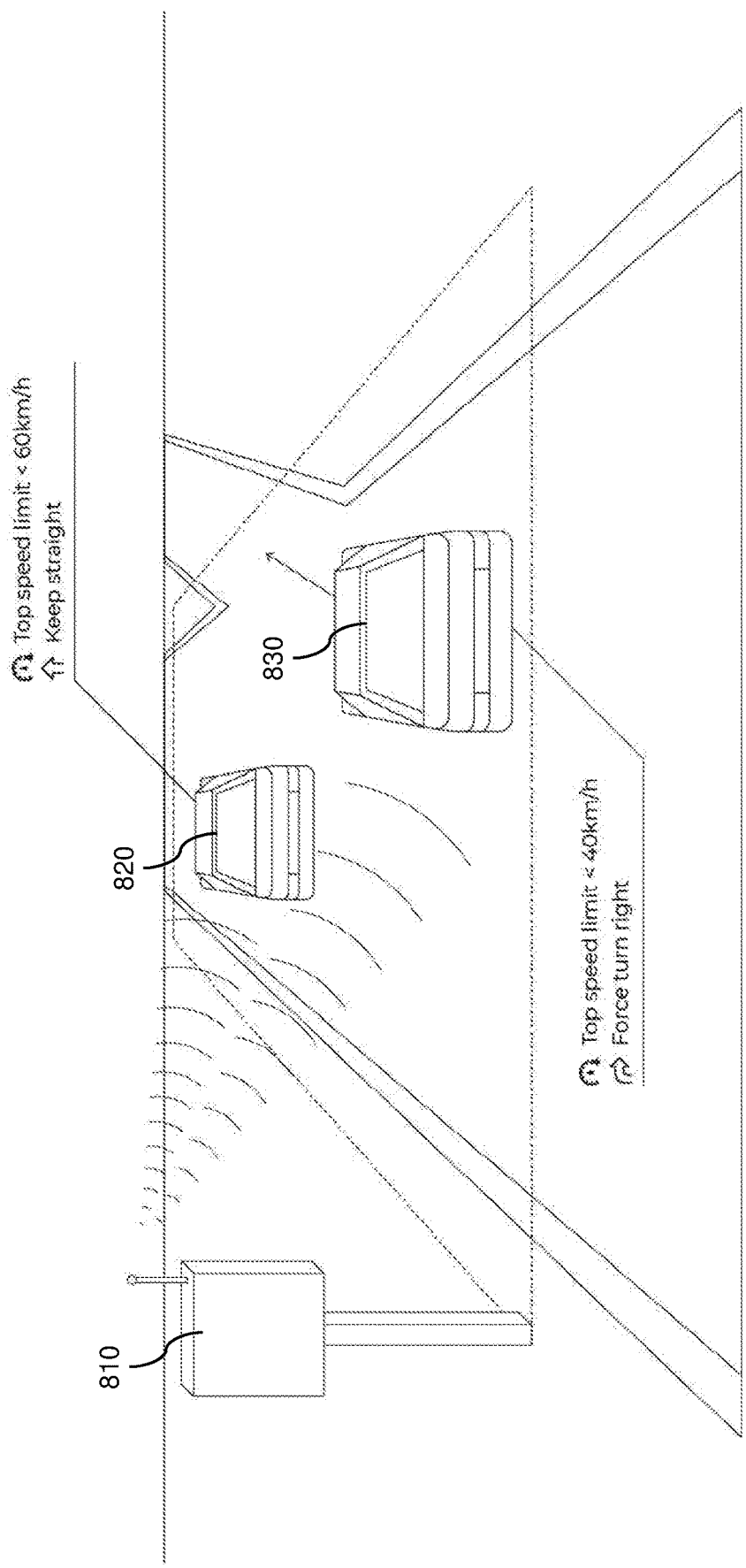
FIG. 8 shows a scenario of traffic management in accordance with an example embodiment.

FIG. 8 shows a scenario of traffic management in accordance with an example embodiment.

By way of example, the road sign transmitter/receiver 810 is set beside the driving path. It identifies the vehicles 820 and 830 by RFID and sends different signals thereto based on the analysis of the driving guidance system (not shown). For example, the vehicle 820 receives a speed limit of 60 km/hour and an instruction of driving straight ahead from the road sign transmitter/receiver 810, while the vehicle 830 receives a speed limit of 40 km/hour and an instruction of turning right from the road sign transmitter/receiver 810.

Figure 9:
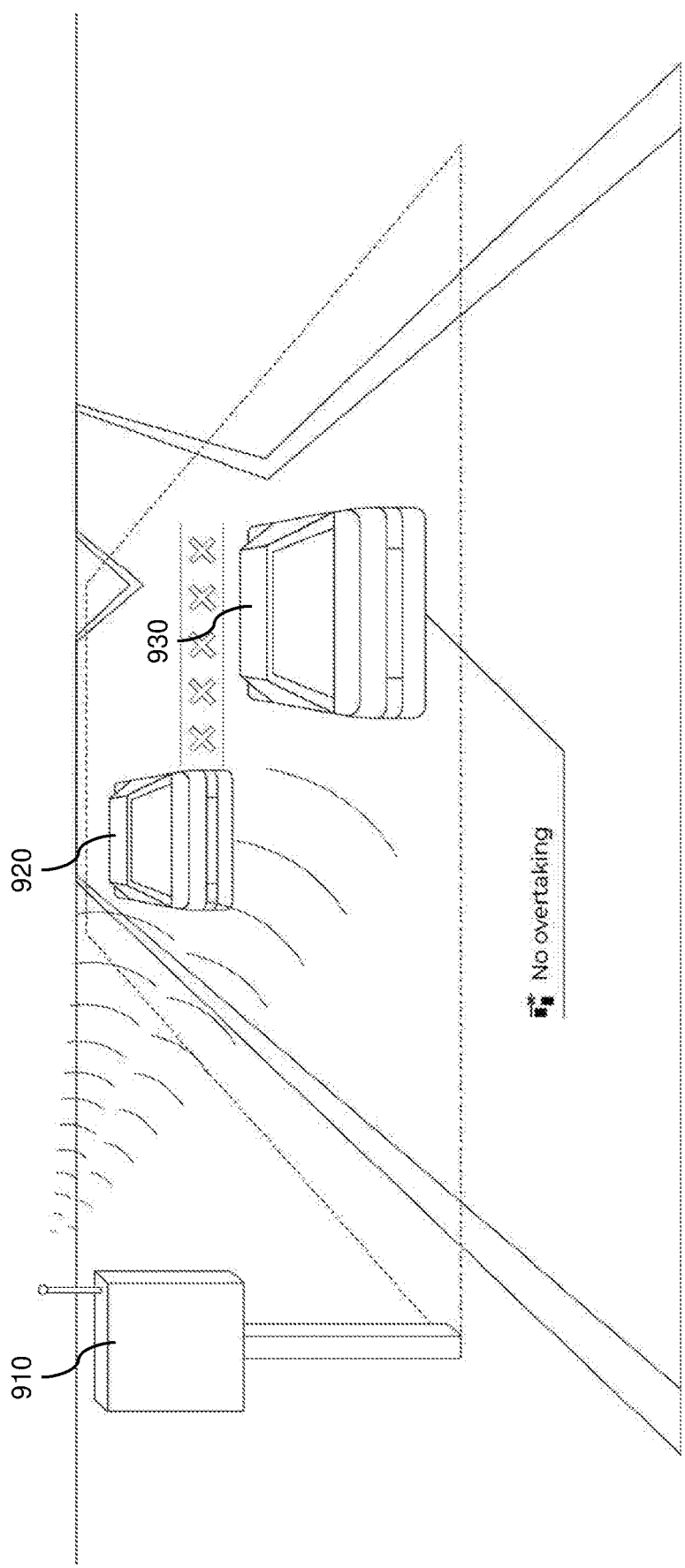
FIG. 9 shows a scenario of sending warning message to the vehicle in accordance with an example embodiment.

FIG. 9 shows a scenario of sending warning message to the vehicle in accordance with an example embodiment.

By way of example, the road sign transmitter/receiver 910 is set beside the driving path. It identifies the vehicles 920 and 930 by RFID. Based on the analysis of the driving guidance system (not shown), the road sign transmitter/receiver 910 sends a warning message to the vehicle 930 and restricts the vehicle 930 not to overtake the vehicle 920 in front for safety.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein. Further, figures and other information show example structures and the parts described in one figure can be added or exchanged with the parts in other figures. Further yet, specific numerical data values (such as specific quantities, numbers, categories, etc.) or other specific information should be interpreted as illustrative for discussing example embodiments. Such specific information is not provided to limit example embodiments.

For example, the vehicle described herein is described as a car, but it is clear that other motorized moving machine may be used according to the user's preference, such as a boat or a drone. Further, the cameras and sensors described is installed beside the racing track, but it is clear that all or partial of them may also be installed in the vehicle or on other appropriate positions.

What is claimed is:

1. A driving guidance system that provides a driving guidance to a driver when the driver makes operations to remotely control a vehicle in a driving route, comprising:
    at least one driving guidance equipment that is distributed along the driving route for recording data of the vehicle;
    an analytic engine that receives and analyzes the data of the vehicle to generate a plurality of features of the vehicle; and
    a control platform, wherein the control platform includes:
        a real virtuality objects generator that generates a plurality of real virtuality objects based on the features of the vehicle;
        a display that shows the real virtuality objects to the driver of the vehicle for providing the driving guidance,
    wherein the driving guidance equipment includes a road sign transmitter that is installed on a road sign for transmitting a second group of control signal to the vehicle when the vehicle approaches the road sign.

2. The driving guidance system of claim 1, wherein the driving guidance equipment includes one or more of a camera, a speed sensor, a pressure sensor, a lap sensor, a sonar sensor, an ultrasound sensor, an infrared sensor and a laser sensor.

3. The driving guidance system of claim 1, wherein the control platform further comprises:
    a speed control unit that generates a first group of control signals to the vehicle according to the driver's operations to control the movement of the vehicle.

4. The driving guidance system of claim 1, wherein the vehicle further comprises a road sign sensor for receiving the second group of control signal when the vehicle approaches the road sign.

5. The driving guidance system of claim 1, wherein the analytic engine further comprises a parameter setting unit that sets a group of parameters for the control signals.

6. The driving guidance system of claim 1, wherein the analytic engine comprises one or more of:
    a trajectory recording unit that generates the trajectory of the vehicle;
    a best performance route generator that generates the best performance route taken by the vehicle;
    an opponent record unit that generates a record of a vehicle driven by a second driver; and
    an information generation unit that generates past records of the driver, and conditions of the driving route.

7. The driving guidance system of claim 1, wherein the driving guidance equipment includes an RFID reader for reading an RFID tag in the vehicle so that the driving guidance equipment identifies the vehicle when recording the data of the vehicle.

8. The driving guidance system of claim 1, wherein the vehicle includes a controller for controlling the vehicle according to the control signals received from the control platform wirelessly.

9. A method for providing a driving guidance to a driver when the driver is making operations to control a vehicle remotely on a driving route, comprising:
    installing, at least one driving guidance equipment along the driving route;
    collecting, by the driving guidance equipment, data of the vehicle;
    generating, by an analytic engine, a plurality of features of the vehicle by analyzing the data of the vehicle;
    generating, by a real virtuality object generator, a plurality of real virtuality objects based on the features of the vehicle;
    displaying, by a display, the real virtuality objects to the driver of the vehicle for providing the driving guidance;
    transmitting, by a road sign transmitter that is installed on a road sign, a second group of control signals to the vehicle when the vehicle approaches the road sign.

10. The method of claim 9, further comprising:
    generating, by a speed control unit, a first group of control signals to the vehicle according to the driver's operations to control the movement of the vehicle.

11. The method of claim 9, wherein the driving guidance equipment includes one or more of a camera, a speed sensor, a pressure sensor, a lap sensor, a sonar sensor, an ultrasound sensor, an infrared sensor and a laser sensor.

12. The method of claim 9, further comprising:
receiving, by a road sign sensor in the vehicle, the second group of control signals when the vehicle approaches the road sign.

13. The method of claim 9, further comprising:
generating, by a trajectory recording unit, a trajectory of the vehicle;
generating, by a best performance route generator, the best performance route taken by the vehicle; and
generating, by an opponent record unit, records of a vehicle driven by a second driver,
wherein, the features of the vehicle includes the trajectory of the vehicle, the best performance route and the records of the vehicle driven by the second driver.

14. The method of claim 9, wherein the driving guidance equipment includes an RFID reader for reading an RFID tag in the vehicle so that the driving guidance equipment identifies the vehicle when collecting the data of the vehicle.

\* \* \* \* \*